(12) United States Patent
Bellant

(10) Patent No.: US 7,380,932 B1
(45) Date of Patent: Jun. 3, 2008

(54) FLOATATION DEVICE FOR EYEGLASS LANYARDS

(76) Inventor: June Hazel Bellant, 1524 83rd St. NW., Bradenton, FL (US) 34209

( * ) Notice: Subject to any disclaimer, the term of this patent is extended or adjusted under 35 U.S.C. 154(b) by 0 days.

(21) Appl. No.: 11/823,980

(22) Filed: Jun. 29, 2007

(51) Int. Cl.
G02C 1/00 (2006.01)

(52) U.S. Cl. .......................................... 351/43; 351/157

(58) Field of Classification Search .................. 351/41, 351/43, 156, 157, 158
See application file for complete search history.

(56) References Cited

U.S. PATENT DOCUMENTS

| | | | | |
|---|---|---|---|---|
| 5,005,263 A | * | 4/1991 | Barrett | 24/3.3 |
| 5,019,000 A | * | 5/1991 | Stephens | 441/6 |
| D456,870 S | * | 5/2002 | Suissa | D21/804 |
| 2004/0156011 A1 | * | 8/2004 | David | 351/43 |

* cited by examiner

Primary Examiner—Huy K Mai
(74) Attorney, Agent, or Firm—Dorothy S. Morset

(57) ABSTRACT

A floatation device for eyeglass lanyards comprising a float member, a quick-release connector, and attachment means adapted for securing the connector to the float member while preferably allowing movement of one relative to the other. At least two such floatation devices are used with each eyeglass lanyard so that when the ends of the lanyard are secured to the earpieces of an eyeglasses frame worn by a user to form a closed loop, the float members will hang comfortably behind the user's neck or upper back until the eyeglasses are inadvertently separated from the user. If the eyeglasses land in water after separation from the user, the lanyard and float member or members will allow the eyeglasses to remain on or near the surface of the water where they can be easily retrieved. The preferred maximum size of each float member is approximately that of a current U.S. fifty-cent piece.

20 Claims, 5 Drawing Sheets

FLOATATION DEVICE FOR EYEGLASS LANYARDS

CROSS-REFERENCES TO RELATED APPLICATIONS

None.

BACKGROUND

1. Field of the Invention

This invention relates to the field of devices attachable to eyeglasses that are configured to prevent them from sinking in water, specifically to a floatation device configured for connection to an eyeglass lanyard and comprising a float member, a quick-release connector such as but not limited to an easily-opened clip or spring snap, and attachment means adapted for securing the connector to the float member while preferably allowing movement of one relative to the other so that the float can hang unobtrusively and comfortably behind a use's neck. Multiple float members are typically attached to the eyeglass lanyard, with the number of float members used determined by the weight of the eyeglass lenses and frame, and the decorative statement desired by the user. The eyeglass lanyard to be used with the present invention is contemplated to have a minimum length dimension of approximately twelve inches. The detachable float members should be configured for rapid and easy connection to the lanyard, as well as connection in a manner that allows them to freely and loosely glide along the lanyard when it is worn by a user. If the eyeglasses make contact with water after separation from the user, the floating lanyard in combination with the float member or members will allow the eyeglasses to remain on or near the surface of the water where they can be easily retrieved. Thus, when transferring the present invention lanyard from a pair of lightweight reading glasses to a potentially heavier pair of sunglasses, an additional float member can easily be added to ensure adequate floatation will be achieved. The float members may spread out on the lanyard once it is in the water, or not, depending upon the weight of the glasses relative to the buoyancy provided by the lanyard and float members, and also depending upon the agitation at the water surface where the glasses made first contact. The float members may have any buoyant configuration and material combination, but preferably would comprise plastic-coated foam or three-dimensional plastic shapes containing trapped air. Although not limited thereto, it is preferred for the maximum size of each float member to be approximately that of a U.S. fifty-cent piece and minimum size of each float member to be approximately that of a U.S. quarter. Also float member shapes can include but are not limited to sports equipment, beach and boating equipment, animals, birds, marine life, sandals, surf board, flowers, dance shoes, and hearts.

2. Description of the Related Art

Lanyards are commonly used to hang a pair of eyeglasses around the neck of a user. However, if the eyeglasses become inadvertently separated from a user and land in water, most lanyards do nothing to prevent the eyeglasses from sinking below the water's surface and becoming irretrievable. A few lanyards do float, but many do not support the full weight of all eyeglasses and leave their users unprotected from accidental loss if their glasses fall into water. The present invention comprises a new or previously purchased lanyard with easily attachable floating devices that can adjust the buoyancy of eyeglasses simply by the addition of one or more present invention floating members, thereby providing a user with a new option for protecting expensive eyeglasses (or favorite sunglasses even if not expensive) from inadvertent loss. Preferably, and for added buoyancy, the lanyard is configured so that it can float. However, since the floating devices of the present invention are readily attachable to any lanyard, they can be attached to prior art lanyards which may or may not float, with the desired buoyancy being achieved by the use of at least one additional float member beyond that needed if the lanyard was configured to float or at least made from material impervious to water. No other device for eyeglasses is known that has a similar structure, functions in the same manner, or provides all of the advantages of the present invention.

BRIEF SUMMARY OF THE INVENTION

The primary object of this invention is to provide a floatation device configured for connection to an eyeglass lanyard that alone or in multiple array maintains an associated pair of eyeglasses on or near the surface of water where they can be easily retrieved. Another object of this invention is to provide a floatation device configured for connection to an eyeglass lanyard comprising detachable float members which can be easily set into place and removed to rapidly allow floatation adjustment different pairs of eyeglasses and enhanced buoyancy for heavier eyeglasses. It is a further object of this invention to provide a floatation device configured for connection to an eyeglass lanyard that is lightweight, durably constructed, and provides an easily visible marker on the water's surface for easy eyeglasses retrieval. It is also an object of this invention to provide a floatation device configured for connection to an eyeglass lanyard that is comfortable and lays in close contact with the user when worn. It is a further object of this invention to provide a floating eyeglasses holder with float members that can decoratively enhance the lanyard, be used alone or with other float members, or be replaced with one or more substitute floats, so that the user can make a variety of fashion statements with a single lanyard.

The present invention, when properly made and used, will provide a floatation device that is attachable to an eyeglass lanyard to prevent the eyeglasses from inadvertently sinking in water, so that they can be easily retrieved. Although it is contemplated for detachable float members to be clipped or otherwise fastened to a lanyard to hang down behind the user's neck or upper back while worn, when in the water the float members typically spread apart from one another on the lanyard to provide a broadened and highly visible marker above the associated eyeglasses that makes them readily spotted and promptly retrievable. The lanyard used with the present invention typically has a minimum length dimension of approximately twelve inches and may have buoyant characteristics of its own, although non-floating lanyards can be used as long as the number of floating members is increased appropriately to compensate for the lack of floatation in the lanyard. Further, the definition of lanyard for present invention purposes is any rope, cord, chain, plastic gimp, woven, non-woven, or other material used between the distal ends of the earpieces of a pair of eyeglasses to support the eyeglasses around a user's neck while the eyeglasses are being worn. At least one detachable float member having a clip or other fastener attached thereto is connected over the lanyard via the fastener, so that when the ends of the lanyard are each secured to a different one of the earpieces of an eyeglasses frame and the eyeglasses make contact with water after separation from the user, the lanyard in combination with the float member or members will allow the eyeglasses to remain on or near the surface of the water where they can be easily spotted and retrieved. As the float members are not heavy and generally small, typically no larger than the dimension of a U.S. fifty-cent piece but larger than a U.S. quarter, and they hang unobtrusively in an out-of-the-way position behind the user's neck or upper back while the eyeglasses are being worn, the present invention is comfortably worn by a user. Preferably, the lanyard and float members are lightweight and durably constructed from foam, spongy, rubber, and/or plastic materials. Also, the float members can have a variety of decorative shapes, and the lanyard and/or float members can have surface decorations that allow the user to create a variety of fashion statements with a single lanyard by using several float members alone or in combination, and substituting float members as often as desired. The weight of the eyeglass lenses and frame, and the decorative statement desired by the user, will be factors used in determining the number of float members used. Also, even if two float members would be required to maintain a pair of eyeglasses on or near the surface of water for easy retrieval, more than two float members could be used. Further, the present invention lanyard could be used with a pair of lightweight reading glasses and have a single float member attached to a floating lanyard, whereas the same floating lanyard would require three float members to support a heavier pair of sunglasses in the same position relative to the water's surface.

The description herein provides preferred embodiments of the present invention but should not be construed as limiting its scope. For example, variations in the length and diameter dimensions of the lanyard used, the shape and dimensions of the floats, the size and type of fastener removably securing the floats to the lanyard, and the number of floats used, other than those shown and described herein, may be incorporated into the present invention. Thus the scope of the present invention should be determined by the appended claims and their legal equivalents, rather than being limited to the examples given.

DETAILED DESCRIPTION OF PREFERRED EMBODIMENTS

Figure 2:
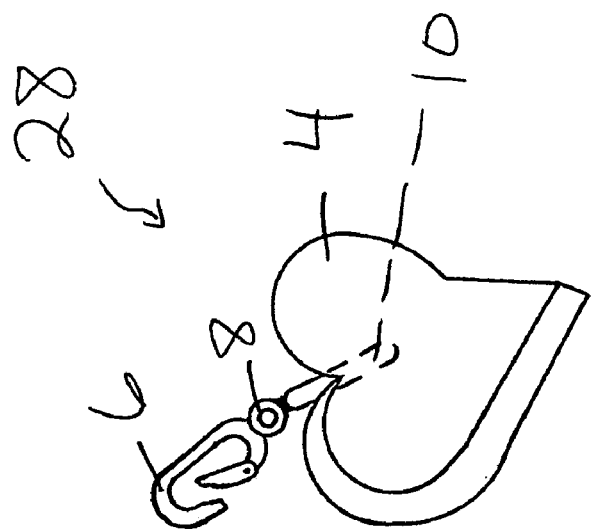
FIG. 2 is a perspective view of a second detachable float in a preferred embodiment of the present invention having a quick-release connector attached to it via attachment means comprising a ring and post, with the shape of the float resembling a heart.

The present invention discloses preferred embodiments of a floatation device (examples are shown respectively in FIGS. 1 and 2 by the numbers 26 and 28) comprising a float member (such as 2 and 4 in FIGS. 1 and 2), a quick-release connector (such as 6 or 16 in FIGS. 3 and 5), and attachment means (such as the example shown in the illustrations collectively by the numbers 8 and 10) that secure float member (2, 4, or other) to quick-release fastener (such as 6, 16, or other). Preferred embodiments of the present invention (such as 26 and 28 in FIGS. 1 and 2, and others) are configured for connection to an eyeglass lanyard (shown in FIGS. 7 and 8 by the number 20) for added buoyancy in applications where a lanyard 20 is connected to the earpieces of a pair of eyeglasses (shown respectively in FIGS. 7 and 8 by the numbers 24 and 22) and the eyeglasses 22 and lanyard 20 are abruptly separated from the person (not shown) wearing them around water, or otherwise bumped or moved from their current location, so that as a consequence they become relocated in a lake, river, bayou, bay, gulf, stream, or other body of water of sufficient depth that recovery of the sunglasses 22 would otherwise be extremely difficult. Although the present invention float members (examples shown in FIGS. 1 and 2 by the numbers 2 and 4) can be used individually on an eyeglass lanyard 20, they are more typically used with at least one other float member (such as 2 or 4) that is identical or completely different in size, configuration, color, surface texture, decorative marking, and/or other surface markings. Further, although not limited thereto, the preferred maximum size of each float member (such as 2 or 4) is approximately that of a current U.S. fifty-cent piece and the preferred minimum size of each float member is approximately that of a current U.S. quarter. Although the float members (such as 2 or 4) may have any buoyant configuration and material combination, preferred materials and construction include plastic-coated foam or three-dimensional plastic shapes containing trapped air. The quick-release connector (such as 6 and 16) used in each present invention floatation device must be easily and rapidly attachable to an eyeglass lanyard 20, be securely engaged to the lanyard 20 during its use to maintain float members (such as 2 and 4) in close association with lanyard 20, and be sufficiently larger than the width and thickness dimensions (or circumference) of lanyard 20 so that connector (6, 16, or other) freely and loosely glides along the length of lanyard 20 for a comfortable fit behind the neck or upper back of a user. Examples of some quick-release connectors preferred for use as a part of the present invention are spring snaps (such as 6), slide bolt spring snaps (such as 16), widely available swivel hooks with a latch (not shown), widely available trigger snaps (not shown). While locking spring snaps (not shown) can also be used, they are not as readily attached and removed from an eyeglass lanyard, and as a result are not as preferred as the other examples mentioned immediately above, even though once attached to lanyard 20 they adequately fulfill the size and other requirements needed for use in the present invention. Also, the attachment means (such as ring 8 and post 10) must secure the quick-release connector (such as 6 or 16) to one or more float members (such as 2 or 4) while allowing movement thereof relative to lanyard 20 so that each float member (such as 2 or 4) can hang closely and comfortably behind a user. The number of float members (such as 2 or 4) used on each eyeglass lanyard 20 is determined by the buoyancy requirement of the lenses and frame of the eyeglasses 20 used, and also depends of the decorative statement desired by the user who may select to use more float members (such as 2 or 4, or others) than are actually needed to satisfy the minimum buoyancy requirement. However, even though surplus for buoyancy purposes, having more float members (such as 2 or 4) increases its capability of being a visible marker in the water. The eyeglass lanyard 20 most commonly contemplated for use with the present invention float members (such as 2 or 4) is approximately twelve inches in length, however, the lanyards 20 used with the present invention may have other length dimensions. It is important for the quick-release connectors (such as 6 and 16) used to attach the float members (such as 2 or 4) to an eyeglass lanyard 20 to be configured for rapid and easy connection to lanyard 20, as well as connection in a manner that allows them to freely and loosely glide along the lanyard 20 when it is worn by a user so that lanyard 20 will hang comfortably on the user. If the eyeglasses 22 make contact with water (not shown) after separation from the user, the floating lanyard 20 and float member or members (such as 2 or 4) combination will allow the eyeglasses 22 to remain on or near the surface of the water where they can be more easily retrieved. Brightly colored materials, designs, and/or markings will make floatation members (such as 2 or 4) even more visible against a water background. In addition, the float members (such as 2 or 4) may spread out on lanyard 20 once it is in the water, or not, depending upon the weight of the eyeglasses 22 relative to the buoyancy provided by lanyard 20 and float members (such as 2 or 4), and also depending upon the agitation at the water surface where the eyeglasses 22 make first contact. If float members (such as 2 and 4) are spread out from one another along the eyeglass lanyard 20, a larger and more visible footprint will be made in the water and increase the likelihood of prompt eyeglass 22 retrieval. The shapes of float members (such as 2 or 4) can be realistic or stylized, and may include but are not limited to subject matter relating to sports paraphernalia, beach and boating equipment, musical instruments, popular hobbies, different kinds of adult and baby animals, an assortment of birds and/or marine life, popular hobbies, favorite children's characters, comic book characters, sandals, flowers, and hearts.

Figure 1:
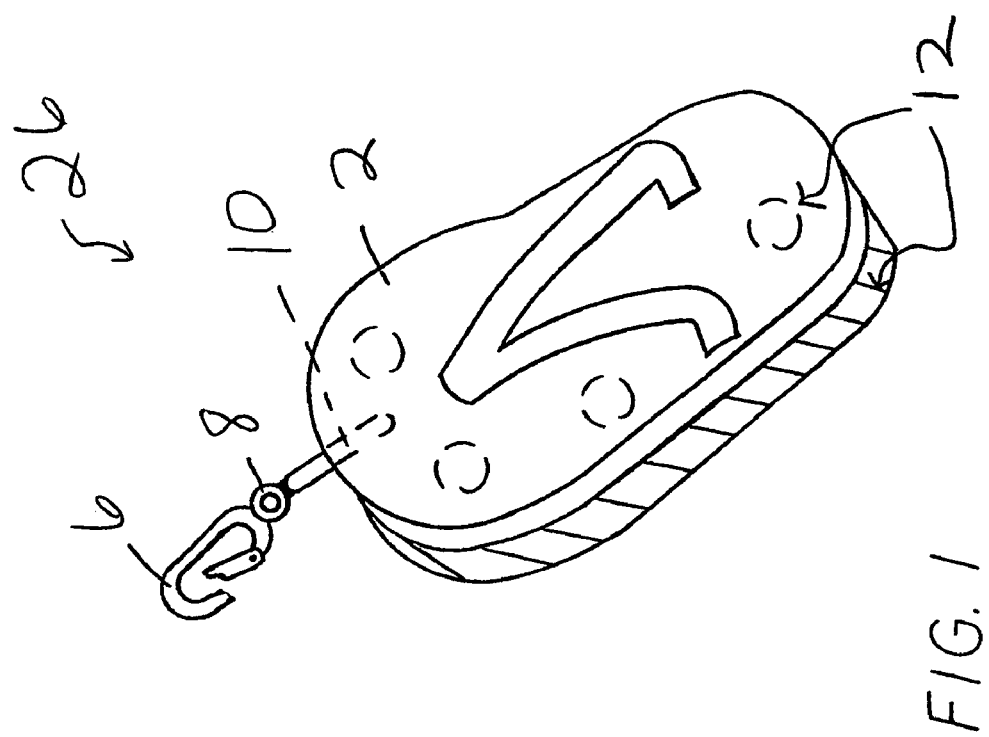
FIG. 1 is a perspective view of a first detachable float in a preferred embodiment of the present invention having a quick-release connector attached to it via attachment means comprising a ring and post, with the shape of the float resembling a beach sandal.

FIGS. 1 and 2 show preferred embodiments of two present invention detachable float members, identified by the numbers 2 and 4, respectively representing a beach sandal and a heart, although not limited to such shapes as long as they otherwise meet size and buoyancy requirements. A quick-release connector 6 in the shape of a spring snap is shown connected to both float members 2 and 4 via an attachment means comprising a ring 8 and a post 10. As previously mentioned, the quick-release connector used is not limited to a spring snap and may also be in the form of a clip, D-clips, bulldog clips, clasps, trigger snap, swivel hook with latch, carabineer, carabineer with a locking gate, carabineer with a screw gate, slide-bolt spring snap, trigger snap, slide-bolt swivel snaps, or other fastener with a closed configuration that allows it to remain securely attached to lanyard 20 when it and attached eyeglasses 22 inadvertently land in the water. In addition, although not shown, one quick-release connector (6, 16, or other) can be used to connect more than one float member (2, 4, or other) to an eyeglass lanyard 20. Further, the configuration of the attachment means used in FIGS. 1 and 2 for securing the quick-release connector 6 to float member 2 or 4 is not critical, and other embodiments of the present invention may comprise a variety of configurations and manufacturing choices, as long as the attachment of the quick-release connector 6 to float member 2 or 4 is sufficiently secure to maintain float members 2 and 4 in close association with the eyeglass lanyard 20 during the time it is in transit between a user and a water surface (not shown). The attachment means (6, 16, or other) used in present invention preferred embodiments should also allow float members 2 and 4 to move relative to the eyeglass lanyard 20 so that they and float members (2, 4, or other) will hang closely and comfortably behind a user's neck. Several examples of alternative attachment means that can be used with different embodiments of the present invention float members (2, 4, or other) are identified below. However, one should consult the claims and consider their legal equivalents for an encompassing definition of the attachment means used as a part of the present invention. Instead of the post 10 shown in FIGS. 1 and 2 having a uniform width dimension, in the alternative although not shown, post 10 could be tapered, barbed, threaded, and possibly have adhesive or a bonding agent helping to secure it to, or preferably within, a float member (2, 4, or other). Further, using FIG. 1 as a reference, connector 6, ring 8, and post 10 can be assembled components, or in the alternative, the connection between ring 8 and connector 6 may be fixed with a pivoting, swivel, or otherwise movable connection being established between ring 8 and post 10. Also, post 10 may be a molded part of float member 2, with a movable connection existing between post 10 and ring 8, or between ring 8 and connector 6. Additionally, post 10 and ring 8 may be a molded part of float member 2, with a movable connection existing between ring 8 and connector 6. Another possible alternative in the present invention is the structure of ring 8, which may have a different configuration than that shown in FIG. 1. Several examples of different ring 8 configurations include a D-shape that is interlocked with connector 6 instead of being securely fixed to the outside surface of connector 6, an elliptical or oval shape, and the shape of another closed polygon, such as but not limited to a triangle, hexagon, or octagon. Preferred materials and construction for the float members 2 and 4 shown in FIGS. 1 and 2 include plastic-coated foam or three-dimensional plastic shapes containing trapped air. It is also important for float members (2, 4, or other) to be made from materials having thermal resistance so that the sun does not heat float members (2, 4, or other) so that they become uncomfortably hot when they are placed against the neck or upper back of a user. UV-resistant materials are also preferred for durability and long-term use outdoors. It is also preferred for float members 2 and 4 to be brightly colored, and have surface texture, decorative marking, and/or other surface markings (represented by the number 12 in FIG. 1) that enhance its visibility against a water surface. The generally circular markings 12 on the top surface of the float member 2 in FIG. 1 may be construed as representing a flat, raised, or depressed configuration.

Figure 4:
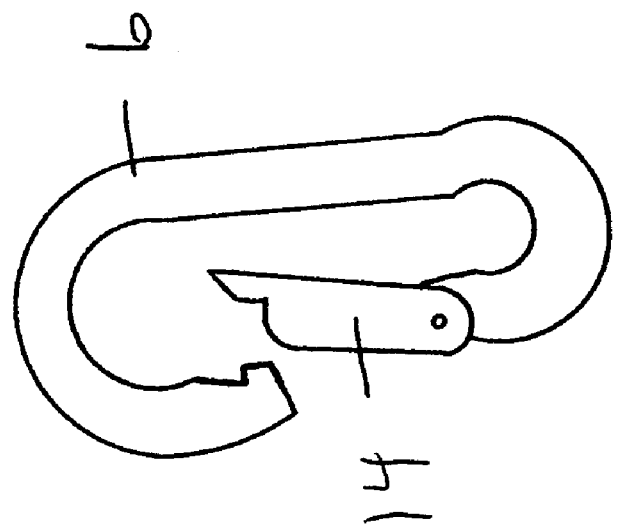
FIG. 4 is a side view of the quick-release connector in FIG. 3 in an opened configuration.
Figure 3:
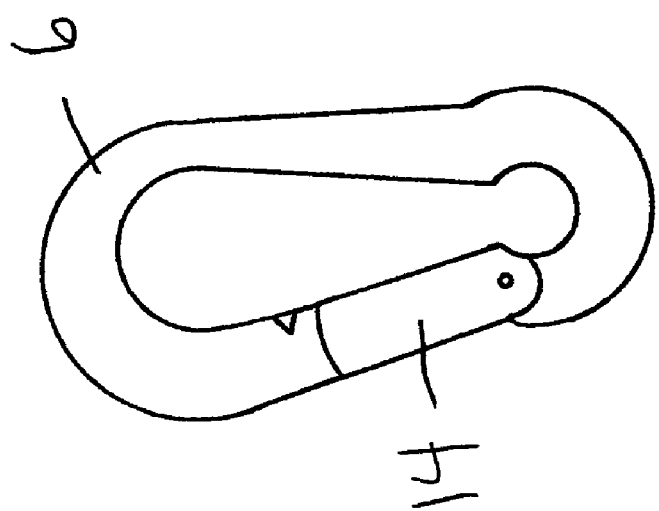
FIG. 3 is a side view of a first quick-release connector in a preferred embodiment of attachment means for securing one or more detachable floats to an eyeglass lanyard, with the connector in its closed configuration of use.
Figure 6:
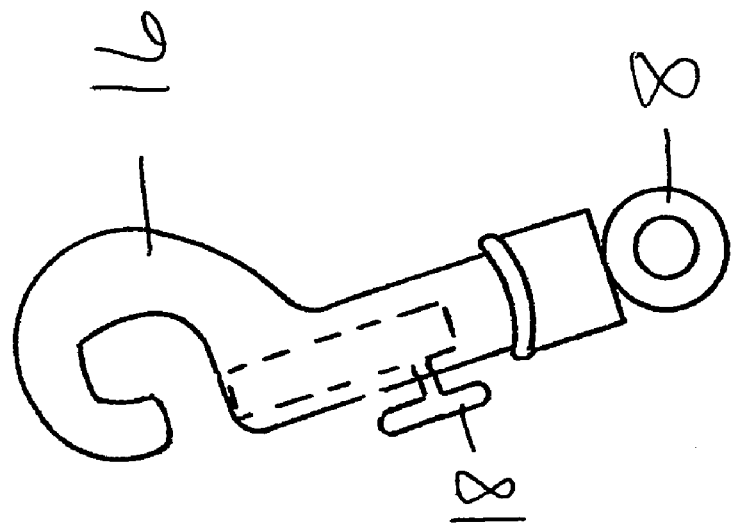
FIG. 6 is a side view of the quick-release connector in FIG. 5 in an opened configuration.
Figure 5:
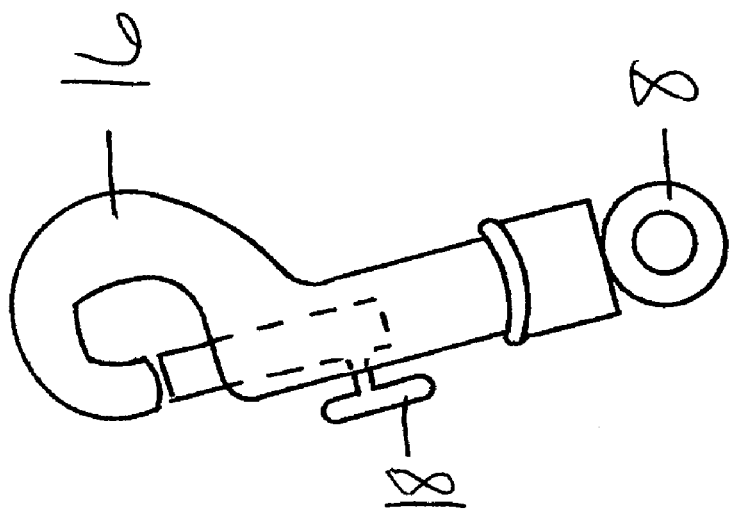
FIG. 5 is a side view a second quick-release connector in a preferred embodiment of attachment means for securing one or more detachable floats to an eyeglass lanyard, with the connector in its closed configuration of use.

FIGS. 3-6 show the quick-release connectors 12 and 16 most preferred in the present invention to attach one or more float members (2, 4, or other) to an eyeglass lanyard 20. FIG. 3 is a side view of a quick-release connector 6 in the shape of a carabineer-style spring snap, with its pivoting member 14 in its closed position to form a closed loop. FIG. 4 is a side view of the same carabineer-style spring snap 6 with its pivoting member 14 in an opened position that allows prompt attachment of connector 6 to an eyeglass lanyard 20, or easy removal therefrom. In contrast, FIG. 5 is a side view of a quick-release connector 16 in the shape of a slide bolt spring snap, with its slide bolt 18 in a closed position of use that would form a closed loop around an eyeglass lanyard 20. FIG. 6 is a side view of the same slide bolt spring snap 16 with its slide bolt 18 in an opened position that allows rapid association and disassociation of slide bolt spring snap 16 with an eyeglass lanyard 20. Although the materials used for connectors 6 and 16 may vary, they should be lightweight, water-resistant, and non-corroding. Plastic and aluminum are examples of materials that can be used for connectors 6 and 16. In addition, it is also preferred that the connectors (6, 16, and other) used in the present invention are brightly colored, and have surface texture, decorative marking, and/or other surface markings (represented by the number 12 in FIG. 1) that enhance its visibility against a water surface. Further, the ring 8 shown in FIGS. 5 and 6 attached to slide bolt spring snap 16 may have a fixed or movable attachment relative to slide bolt spring snap 16, and if a fixed ring 8 is present, an interlocking connection with another connecting piece may be used to allow lanyard 20 with several float members (2, 4, or other) to comfortably hang behind a user when an associated pair of eyeglasses 22 are worn.

Figure 7:
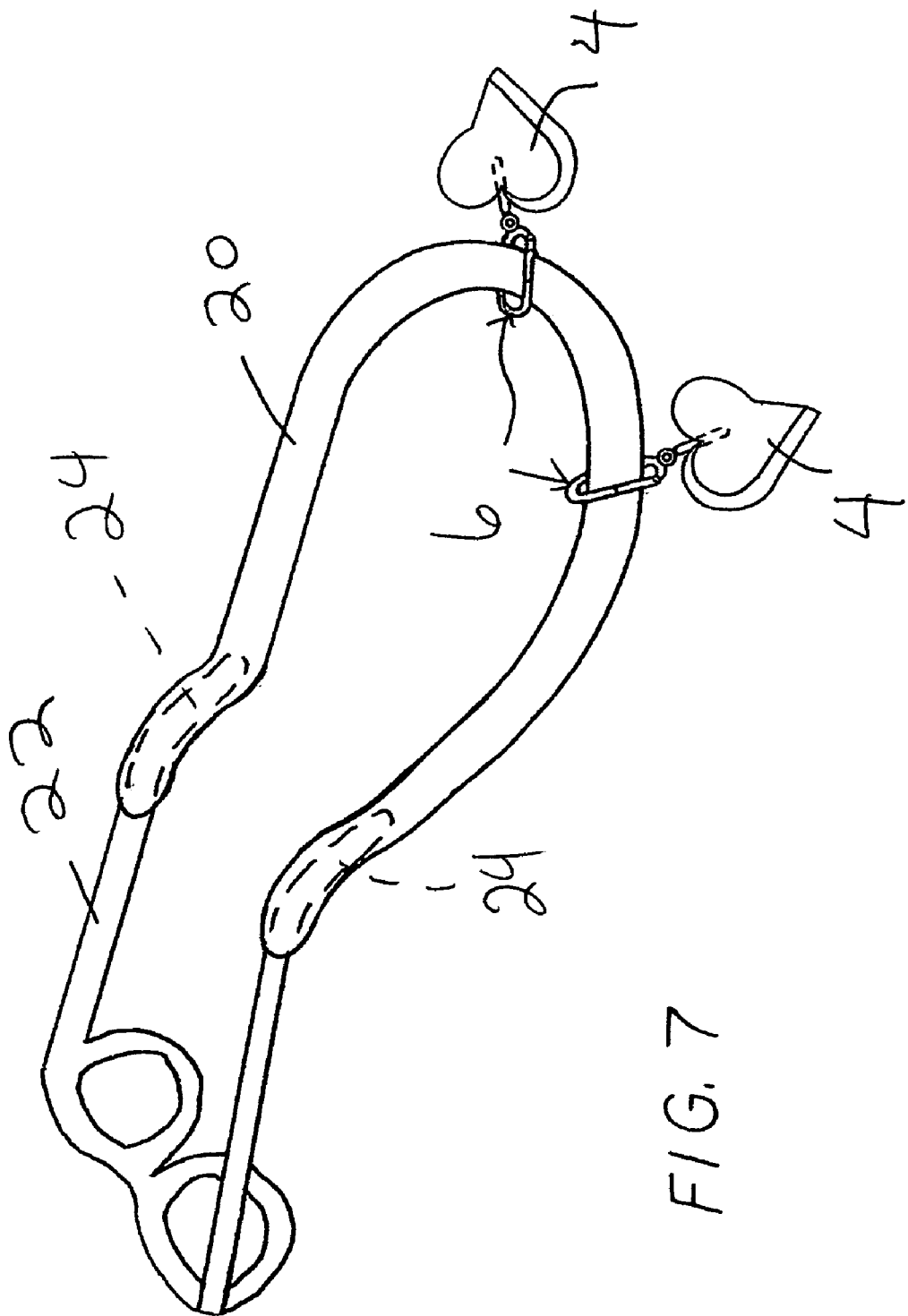
FIG. 7 is a perspective view of a two second detachable floats each secured to an eyeglass lanyard via one of said first quick-release connectors.
Figure 8:
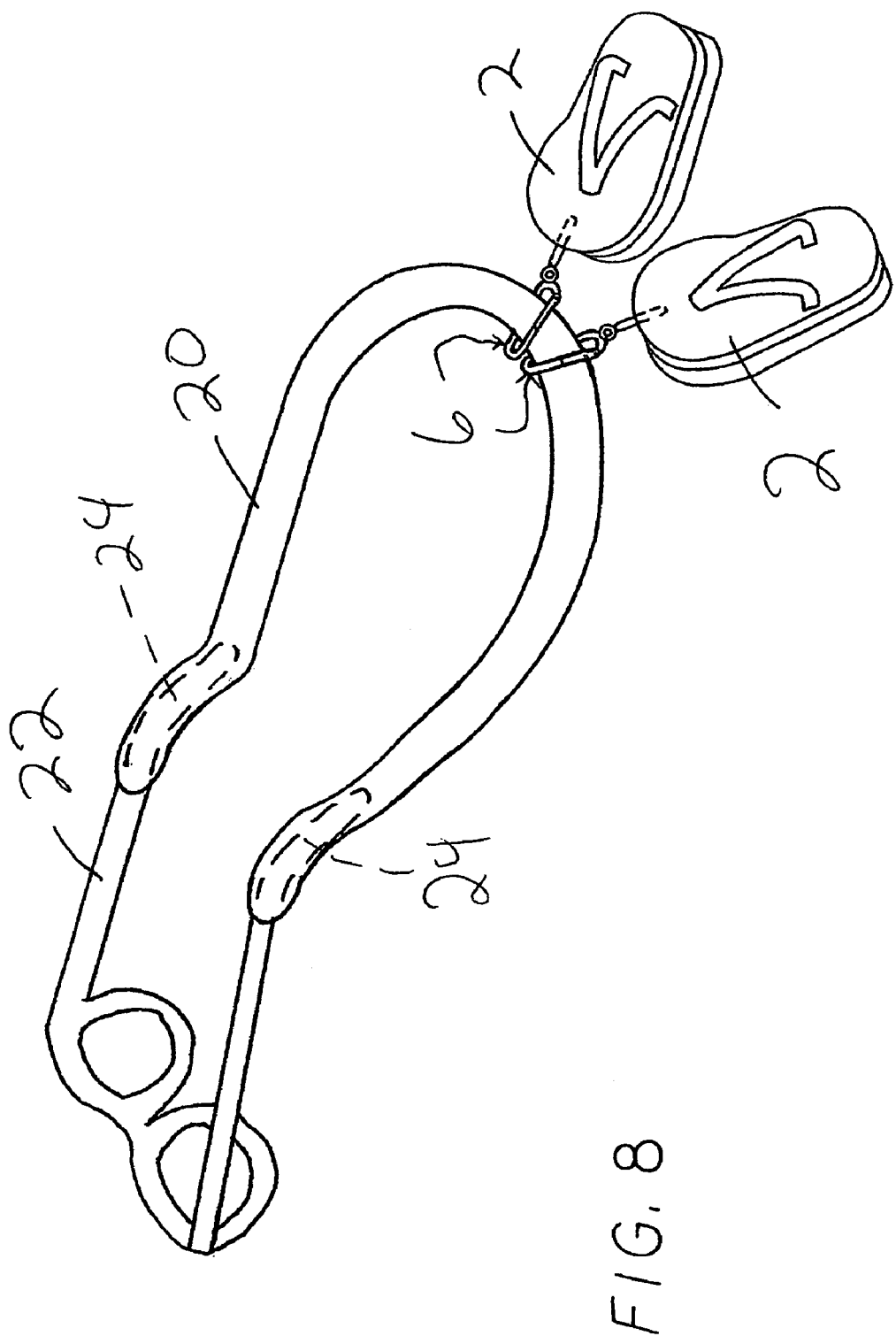
FIG. 8 is a perspective view of a two first detachable floats each secured to an eyeglass lanyard via one of said first quick-release connectors.

FIGS. 7 and 8 show an eyeglass lanyard 20 connected to the earpieces 24 of eyeglasses 22, and two present invention float members (respectively 4 and 2) connected to eyeglass lanyard 20 via a quick-release connector 6. The preferred material for lanyard 20 is a rubber cord. However, lanyards 20 made from other materials can also be used, including but not limited to rope and chain. Although not shown, a different number of float members (2, 4, or other) can be used on a lanyard 20, and more than one float member (2, 4, or other) of similar or different size and configuration to that shown in FIGS. 7 and 8 can be attached to each connector (6, 16, or other) used. Also, the float members (2, 4, or other) used on a single lanyard 20 may all be the same size and configuration, the same configuration and different sizes, the same configuration and size and different colors or surface design, the same configuration and size and similar colors/design, or the same size and different configurations. The minimum number of float members (2, 4, or other) used on lanyard 20 should be that sufficient to maintain eyeglasses 22 at or near the surface of water should they and lanyard 20 inadvertently land in water more than a foot or two in depth. Also, float members (2, 4, or other) should be lightweight and durably constructed, and preferably are made from plastic-coated foam or three-dimensional plastic shapes containing trapped air, although not limited thereto. Further, the attachment means between connectors 6 and float members 2 and 4 may be different from that shown. In addition, although not strictly limited thereto, it is contemplated for float members (2, 4, or other) to have a maximum dimension approximately that of the current U.S. fifty-cent piece, and a minimum dimension approximately that of the current U.S. quarter. FIG. 7 is a perspective view of two heart-shaped detachable floats 4 each secured to an eyeglass lanyard 20 via one quick-release connector 6, with FIG. 8 being a perspective view of two sandal-shaped detachable floats 2 each secured to an eyeglass lanyard 20 via one quick-release connector 6. FIG. 7 shows the heart-shaped float members 4 more spread out from one another on eyeglass lanyard 20 than the beach sandal float members 2 shown in FIG. 8. Thus, FIG. 8 is more likely to represent the orientation of float members 2 behind the neck of a user, with FIG. 7 more likely representing float members 4 on the surface of water. Even if eyeglasses 22 and the lanyard 20 attached to them have some buoyancy, the use of the present invention float members (2, 4, or other) is beneficial to create a highly visible marker in the water, particularly when the eyeglass lanyard 20 is a neutral color or another color that does not stand out against a water background. Also, when the brightly colored present invention float members (2, 4, or other) spread out from one another on a water surface, as they will sometimes do depending upon the agitation present in the water in the impact area, and the angle of entry into the water, a bigger footprint is made in the water for enhanced visibility. Lanyards 20 and float members (2, 4, or other) may be marketed individually, or in combination.

What is claimed is:

1. A buoyant device for connection to a lanyard attached to the two elongated earpieces of a pair of eyeglasses wherein a closed-loop configuration is formed and maintaining the lanyard and eyeglasses on or near the surface of water should they become inadvertently separated from a user and land in the water, said device comprising:

at least one float member constructed so that it is able to float on water, quick-release connection means adapted for easy and rapid attachment to the eyeglass lanyard, adapted for maintaining said at least one float member in close association with the lanyard, adapted for secure engagement with the lanyard, and adapted for being sufficiently larger than the cross-section of the lanyard to allow for free and loose gliding capability along the length of the lanyard; and attachment means adapted for secure association of said connection means to said at least one float member, so that when the eyeglasses become separated from a user and land in water, said at least one float member will support the eyeglasses on or near the surface of the water where they can be easily retrieved.

2. The device of claim 1 wherein said quick-release connection means is selected from a group consisting of carabineers, carabineers with a locking gate, carabineers with a screw gate, clips, D-clips, bulldog clips, clasps, spring snaps, slide-bolt spring snaps, trigger snaps, and slide-bolt swivel snaps.

3. The device of claim 1 wherein said at least one float member has a minimum overall dimension approximately equivalent to that of a current U.S. quarter.

4. The device of claim 1 wherein said at least one float member has a maximum overall dimension approximately equivalent to that of a current U.S. fifty-cent piece.

5. The device of claim 1 wherein said at least one float member has a minimum overall dimension approximately equivalent to that of a current U.S. quarter and a maximum overall dimension of approximately equivalent to that of a current U.S. fifty-cent piece.

6. The device of claim 1 wherein the lanyard used there with is configured to float and the lanyard in combination with one float member is able to support the eyeglasses on or near the surface of the water where they can be easily retrieved.

7. The device of claim 1 wherein said at least one float member is selected from a group consisting of float members comprising colors that are easily visible against a water surface, float members comprising plastic, float members comprising foam, float members having decorative markings, float members having surface texture, float members made from UV-resistant materials, and float members made from thermal resistant materials.

8. The device of claim 1 wherein said attachment means is further adapted for movement of said at least one float member relative to said attachment means so that said float member is able to hang comfortably behind a user when the eyeglasses are worn.

9. The device of claim 1 wherein said attachment means comprises colors that are easily visible against a water surface.

10. The device of claim 1 wherein said connection means comprise colors that are easily visible against a water surface.

11. The device of claim 1 wherein said attachment means comprises a ring.

12. The device of claim 1 wherein said attachment means comprises a post.

13. A method of providing buoyancy to a pair of eyeglasses using the device in claim 1, said method comprising the steps of:
    providing a pair of eyeglasses, a lanyard, and the device in claim 1 configured with at least one float member constructed so that it is able to float on water; quick-release connection means adapted for easy and rapid attachment to the eyeglass lanyard, adapted for maintaining said at least one float member in close association with the lanyard, adapted for secure engagement with the lanyard, and adapted for being sufficiently larger than the cross-section of the lanyard to allow for free and loose gliding capability along the length of the lanyard; and attachment means adapted for secure association of said connection means to said at least one float member
    connecting said lanyard to the earpieces of the eyeglasses so as to form a closed loop configuration with the lanyard and eyeglasses;
    using said attachment means to securely connect said quick-release connection means to said at least one float member; and
    attaching said quick-release connection means to said lanyard so that when said eyeglasses become separated from a user and land in water, said at least one float member will support said eyeglasses on or near the surface of the water where they can be easily retrieved.

14. The method of claim 13 wherein the order in which the steps of connecting, using, and attaching are accomplished is different.

15. The method of claim 13 wherein said quick-release connection means is selected from a group consisting of carabineers, carabineers with a locking gate, carabineers with a screw gate, clips, D-clips, bulldog clips, clasps, spring snaps, slide-bolt spring snaps, trigger snaps, and slide-bolt swivel snaps.

16. The method of claim 13 wherein said at least one float member has a minimum overall dimension approximately equivalent to that of a current U.S. quarter.

17. The method of claim 13 wherein said at least one float member has a maximum overall dimension approximately equivalent to that of a current U.S. fifty-cent piece.

18. The method of claim 13 wherein said lanyard is configured to float and said lanyard in combination with only one float member is able to support the eyeglasses on or near the surface of the water where they can be easily retrieved.

19. The device of claim 13 wherein said at least one float member is selected from a group consisting of float members comprising colors that are easily visible against a water surface, float members comprising plastic, float members comprising foam, float members having decorative markings, float members having surface texture, float members made from UV-resistant materials, and float members made from thermal resistant materials.

20. The device of claim 13 wherein said attachment means is further adapted for movement of said at least one float member relative to said attachment means so that said float member is able to hang comfortably behind a user when the eyeglasses are worn.

* * * * *